United States Patent
Deppe et al.

(10) Patent No.: US 7,103,330 B2
(45) Date of Patent: Sep. 5, 2006

(54) METHOD OF TRANSMITTING INFORMATION BETWEEN AN INFORMATION TRANSMITTER AND AN INFORMATION RECEIVER

(75) Inventors: Carsten Deppe, Aachen (DE); Thomas Dürbaum, Baiersdorf (DE); Georg Sauerländer, Aachen (DE); Peter Lürkens, Aachen (DE); Tobias Georg Tolle, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 394 days.

(21) Appl. No.: 10/764,084

(22) Filed: Jan. 23, 2004

(65) Prior Publication Data

US 2004/0171354 A1    Sep. 2, 2004

(30) Foreign Application Priority Data

Jan. 28, 2003    (EP) .................................. 03100176

(51) Int. Cl.
*H04B 1/04* (2006.01)

(52) U.S. Cl. ............................... 455/127.1; 455/343.2; 455/572; 455/574

(58) Field of Classification Search ............. 455/127.1, 455/127.7, 127.5, 78, 572, 574, 343.1, 343.2, 455/343.6, 83, 86, 87; 365/149
See application file for complete search history.

(56) References Cited

U.S. PATENT DOCUMENTS

| | | | | |
|---|---|---|---|---|
| 4,158,175 A | * | 6/1979 | Toyomaki | 455/257 |
| 4,484,354 A | * | 11/1984 | Bennett et al. | 455/701 |
| 4,703,324 A | * | 10/1987 | White | 340/825.2 |
| 5,339,460 A | * | 8/1994 | Sakata et al. | 455/343.1 |
| 5,355,518 A | * | 10/1994 | Kindinger et al. | 340/7.34 |
| 5,566,359 A | * | 10/1996 | Corrigan | 455/78 |
| 5,650,970 A | * | 7/1997 | Kai | 365/203 |
| 6,064,857 A | * | 5/2000 | Wiedeman et al. | 455/127.4 |
| 6,442,407 B1 | * | 8/2002 | Bauer et al. | 455/574 |
| 2002/0016713 A1 | * | 2/2002 | Piret | 704/500 |
| 2002/0141226 A1 | * | 10/2002 | Kato et al. | 365/149 |

* cited by examiner

*Primary Examiner*—Lana Le

(57) ABSTRACT

The invention describes a method of transmitting information between an information transmitter and an information receiver, the potential difference of which moves in cycles between a minimum value and a maximum value and is situated at the minimum value for regular intervals; having the steps: provision of information over the time interval or determining the time interval in which the potential difference between information transmitter and information receiver assumes its minimum value; closing of a switching means of the information transmitter in relation to an information memory assigned to the information receiver, only within the time interval; and transmission and storage of the information in the information memory.

18 Claims, 7 Drawing Sheets

METHOD OF TRANSMITTING INFORMATION BETWEEN AN INFORMATION TRANSMITTER AND AN INFORMATION RECEIVER

The invention relates to a method of transmitting information between an information transmitter and an information receiver, the potential difference of which moves in cycles between a minimum value and a maximum value and is situated at the minimum value for regular intervals.

In many applications, information such as voltage value, current values, time values and the like must be transmitted to the power electronics over a high potential difference. The transmission of the control signals is also referred to as the "level shift". The methods used for this are complicated, expensive or consume a not insignificant amount of power.

There are two lossless methods, but they both have considerable disadvantages.

The first includes a transmitter for potential separation, which is nevertheless expensive, and solutions for rapid switch-off and as a result low switching losses necessitate further considerable expenditure.

The second solution to the problem is by means of optical coupling, but rapid optical couplers are extremely expensive and further driver circuits are necessary.

The fully integrated method most often used at present is the transmission of switch-on and switch-off information by means of short pulses on a high-side logic supplied by way of a bootstrap capacitor and sliding with the transistor potential. On account of the high voltage difference, despite small currents and short pulses there is nevertheless a considerable consumption of power. Since this power is converted in the chip and increases with the switching frequency, it represents a hard limit for the possible frequency range when there is a risk of overheating of the chip. Moreover, the degree of efficiency is reduced. This is particularly problematic in light load operation, that is to say when the power supply only has to supply a small amount of power, for example in standby. Since, in the case of resonant power supplies, the frequency even increases further here, the required power is particularly appreciable.

In many cases, for example in driver circuits which are used to control a resonant converter, the potential of the information receiver moves in regular cycles between a maximum and a minimum value, where the minimum value is equal to the potential of the information transmitter, that is to say the controller.

It is an object of the present invention to provide a method of the type mentioned above, by means of which a virtually lossless transmission of information is possible, particularly for circuits such as these.

This object is achieved by a method as claimed in claim 1. Advantageous refinements form the subject matter of the subclaims. A driver circuit which implements the method according to the invention is the subject matter of claim 11 and of the subclaims dependent thereon.

According to the invention, a method of transmitting information of the type mentioned above has the following steps:

provision of information over the time interval or determination of the time interval in which the potential difference between information transmitter and information receiver assumes its minimum value;

closing of a switching means of the information transmitter in relation to an information memory assigned to the information receiver, only within the time interval; and transmission and storage of the information in the information memory.

If, therefore, the time of information transmission falls precisely within the time interval in which information transmitter and information receiver have practically the same potential, only minimal losses occur.

In order for it to be possible for the required information subsequently to be made available, said information must be stored. This is preferably effected by it being stored in the information memory as a set of charges.

The information may be a current value which is supplied over a predetermined on-time of the switching means. The information may also be a voltage value. In both cases, a fixed value, for example the voltage value, is transmitted and stored. The on-time of the switching means is in principle irrelevant.

If the information is itself a time value, the switching means is closed for this time, specifically within the time interval in which the potential difference between information transmitter and information receiver assumes the minimum value. Transmission and storage then form part of a single process, for example the charging of a capacitor for storing the set of charges with a current.

Digital transmission of information is also conceivable in that, for example, the switching means is closed and opened a number of times within a time interval in order in this way to transmit a numerical value or in that an appropriately modulated signal is transmitted while the switching means are closed.

It is particularly preferred if the voltage value is used to set, synchronize or trace the frequency of a voltage-controlled oscillator (VCO), which then triggers events by way of counter registers. In this case, the capacitor and the switching means form a sample-and-hold stage in which the control signal for the VCO is stored.

According to a particular aspect, the method is carried out in a circuit which converts a DC voltage into a clocked output voltage, in which the driver assigned to the lower switching means, or more precisely the control electronics which are normally at the potential of the lower switching means, said control electronics in turn activating the power components by way of the driver, is the information transmitter, where a high-voltage part for controlling the upper switching means and a low-voltage part for controlling the lower switching means are provided, characterized in that the current value $I_1$ for generating the set of charges is made to be proportional to the discharge current $I_2$, so that $$I_1 = k * I_2 \text{ with } k > r_{max} > 1,$$

where $r_{max}$ is the maximum occurring duty cycle, defined as the maximum on-time of the upper switching means divided by the minimum on-time of the lower switching means. The on-time $T_{EHS}$ for the upper switching means is in this case stored as a charge by switching on the current $I_1$ for a time $t_{EHS}/k$, said charge being converted back into a time by the discharge current $I_2$.

In a particular subgroup of the circuits, the switch-off condition for the upper switching means, for example a transistor, is determined by measuring the current. The transistor is switched off when a predefined threshold is reached. In this case, too, the additional problem arises that this information is initially present at a high potential.

In the above-mentioned circuit, in order to solve such a problem the method according to the invention can be carried out in accordance with a further aspect, by a current value being determined which corresponds to a switch-off condition of the upper switching means, and the information memory being charged to a voltage that is proportional to the current value of the switch-off condition. In the capacitor, the information is stored and can be read once the upper transistor and the driver stage have reached the high potential. While the transistor is active, a comparator compares the capacitor voltage with a voltage across a current measuring shunt, which represents the current value. If both are the same, the transistor is switched off.

The time at which the transistor is to be switched on is realized with the aid of an additional logic in the driver. This may, for example, be the time at which the voltage across the transistor that is to be switched on is zero.

By means of the invention, it is also possible for there to be a settable excess current switch-off, irrespective of the type of converter.

According to a third aspect, a current value is then determined which corresponds to a switch-off condition of a load controlled by the driver circuit, and the information memory is charged to a voltage that is proportional to the current value of the switch-off condition, where the switch-off condition is a previously determined excess current across the upper switching means.

According to a further aspect, it is provided that, during the time at the minimum value of the potential difference, the information memory is charged to a voltage that is proportional to the on-time of the upper switching means, and the voltage is converted into a time once the upper switching means have reached the maximum value of the potential.

A driver circuit for controlling upper switching means as information receiver and lower switching means as information transmitter for converting a DC voltage into a clocked output voltage which has a high-voltage part for controlling the upper switching means and a low-voltage part for controlling the lower switching means, by means of which the method according to the invention can in particular be implemented, is characterized in that there is provided a device for providing information about the time interval or for determining the time interval in which the potential difference between information transmitter and information receiver assumes its minimum value, and a switching means which closes a connection from the information transmitter to an information memory for the information, which is assigned to the receiver, only within this time interval.

The information memory may be an analog memory or a digital memory. In the case of an analog memory, a capacitor is particularly preferred. As an example of a digital memory, mention may be made of a counter or a register.

The individual aspects of the method according to the invention can be implemented by means of appropriately modified driver circuits.

If the method is carried out using a counter, on the upper side an oscillator operates at a fixed frequency. During the time interval of the small potential difference, the switching means is closed for a determined time, as a result of which the counter is activated and counts up the oscillations of the oscillator. After the time has expired, it remains at a specific point. During the on-time of the upper switching means, the counter then counts backward again with the frequency of the oscillator. Upon reaching zero, the upper switching means is switched off.

In order to allow asymmetric duty cycles in this technique, the counter must count upward faster than it does downward. This can be achieved by the counter being forwarded by k stages with each pulse of the oscillator during upward counting, where k is an integer. During backward counting, it is always decreased by one stage or by fewer stages than during upward counting. This corresponds exactly to the effect of the different current values in the analog version.

The invention will be further described with reference to examples of embodiments shown in the drawings to which, however, the invention is not restricted.

Figure 1:
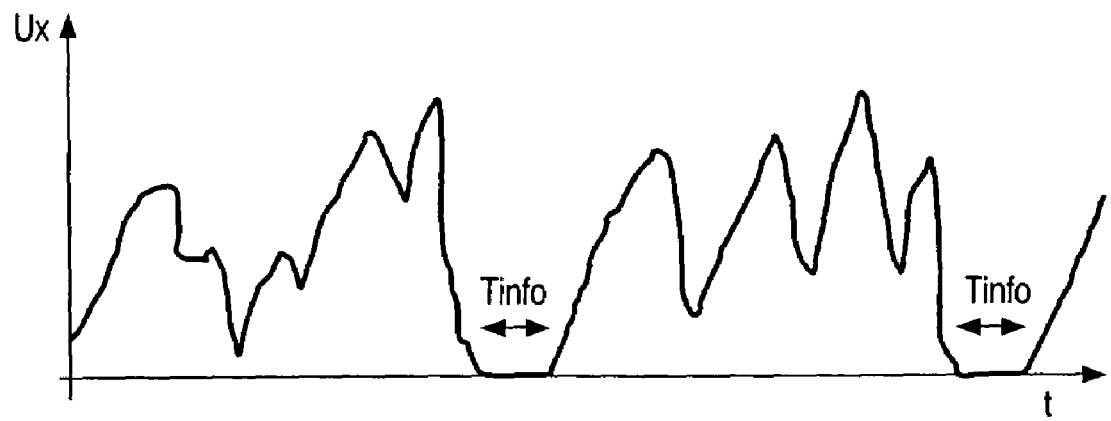
FIG. 1 shows a graphic illustration of the potential difference over time, which is intended to show the principle of the invention.

FIG. 1 shows a graphic illustration of the profile of the potential difference between information transmitter and information receiver. In the time intervals Tinfo in which the potential difference Ux is known to be equal to zero, a switching means, for example a transistor, is closed and the information is stored in an information memory. The information may for example be a voltage value. Often, however, an implementation using a current value and a defined on-time of the switching means is more favorable. In the information memory, the information is expediently stored as a set of charges.

Figure 2:
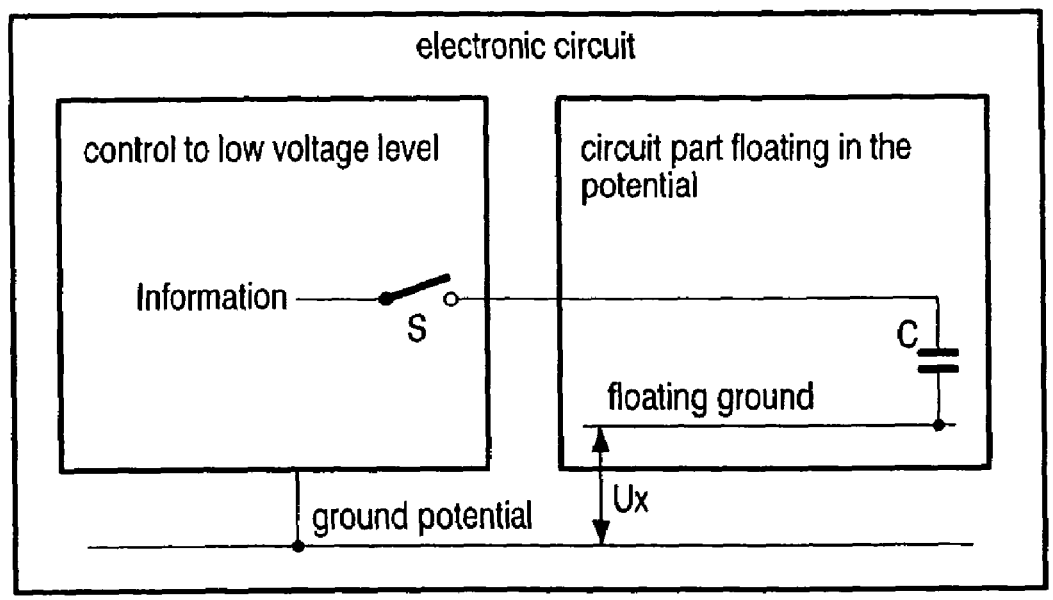
FIG. 2 shows a block diagram, which is highly simplified, of an electronic circuit in which the invention can be implemented.

FIG. 2 shows a highly simplified block diagram of an electronic circuit, by means of which the method according to the invention is implemented. It is assumed that a capacitor C is used for storing the information. Said capacitor C is in principle located in that part of the circuit which is "floating" in terms of its potential, that is to say for example alternates cyclically between ground potential and high voltage. As soon as it is at ground potential, the potential difference between information transmitter and information receiver is at a minimum or equal to zero, the switch S can be closed and the information can be transmitted.

Figure 3:
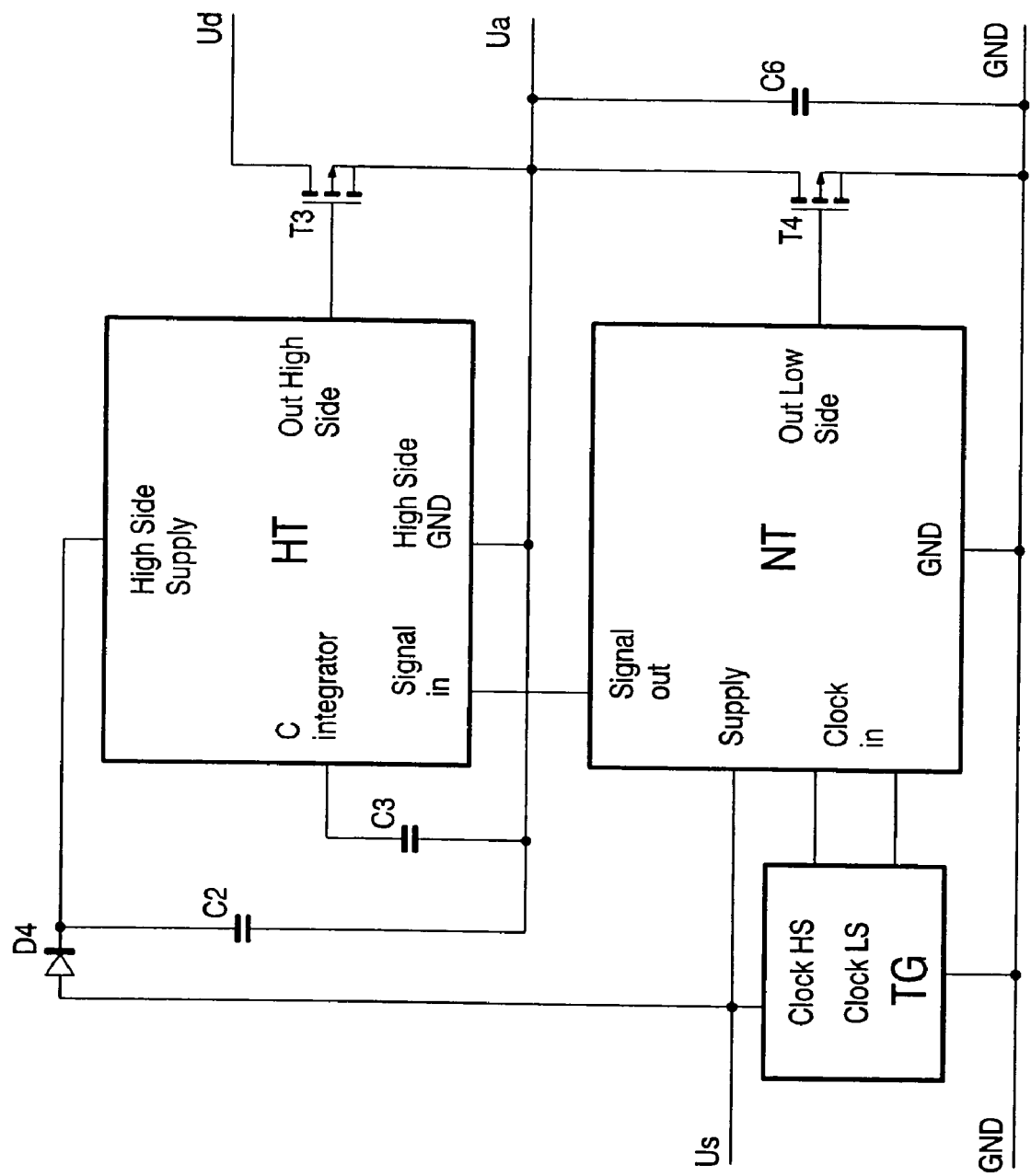
FIG. 3 shows a block diagram of a driver circuit as a basis for implementing the method according to the invention.

FIG. 3 shows a circuit diagram of a driver circuit for a resonant converter. It has a half-bridge circuit having an upper MOSFET T3 and a lower MOSFET T4 which are connected in series, with the input DC voltage Ud being present across the upper MOSFET T3 and a low potential being present across the lower MOSFET T4. Between the series-connected MOSFETs T3, T4, the output voltage Ua is tapped off via the ground potential. A capacitor C6 for setting dUa/dtmax is provided in parallel with the lower MOSFET T4.

The driver circuit comprises a high-voltage part HT for controlling the on-times of the MOSFET T3 and a low-voltage part NT for controlling the on-times of the MOSFET T4, where the on-times of the MOSFETs T3, T4 alternately follow one another and are separated from one another by dead-time phases.

The low-voltage part NT has an input Supply (referred to as S in the other figures for the sake of brevity) for the supply voltage Us of the control electronics (small voltage) and an input GND which is at ground potential. The low-voltage part NT is connected to the gate electrode of the MOSFET T4 via the output Out Low Side (OLS). Furthermore, the low-voltage part NT is coupled to the high-voltage part HT via the output Signal Out (SO). Finally, the low-voltage part NT has a clock input Clock In (TI) at which the clock signal of a clock generator TG is present.

The high-voltage part HT has an input High Side Supply (HSS) for the supply voltage Us and an output High Side GND (HSGND) which is connected to the output Ua of the half-bridge circuit. The input High Side Supply is supplied via a bootstrap circuit C2, D4, where the input is connected to the supply voltage Us via a diode D4 and, by way of a capacitor C2, is connected to High Side GND of the half-bridge circuit across which the potential Ua is present. Furthermore, the high-voltage part HT is coupled to the low-voltage part NT via the output Signal In (SI).

The control of the on-time is not taken into account in the circuit.

Furthermore, an integrated circuit arrangement is provided with a capacitor C3, one side of which is at the potential of the output voltage Ua, which is the ground potential High Side GND for the high-voltage part HT of the driver circuit. The other side is coupled to an input C Integrator.

Figure 4:
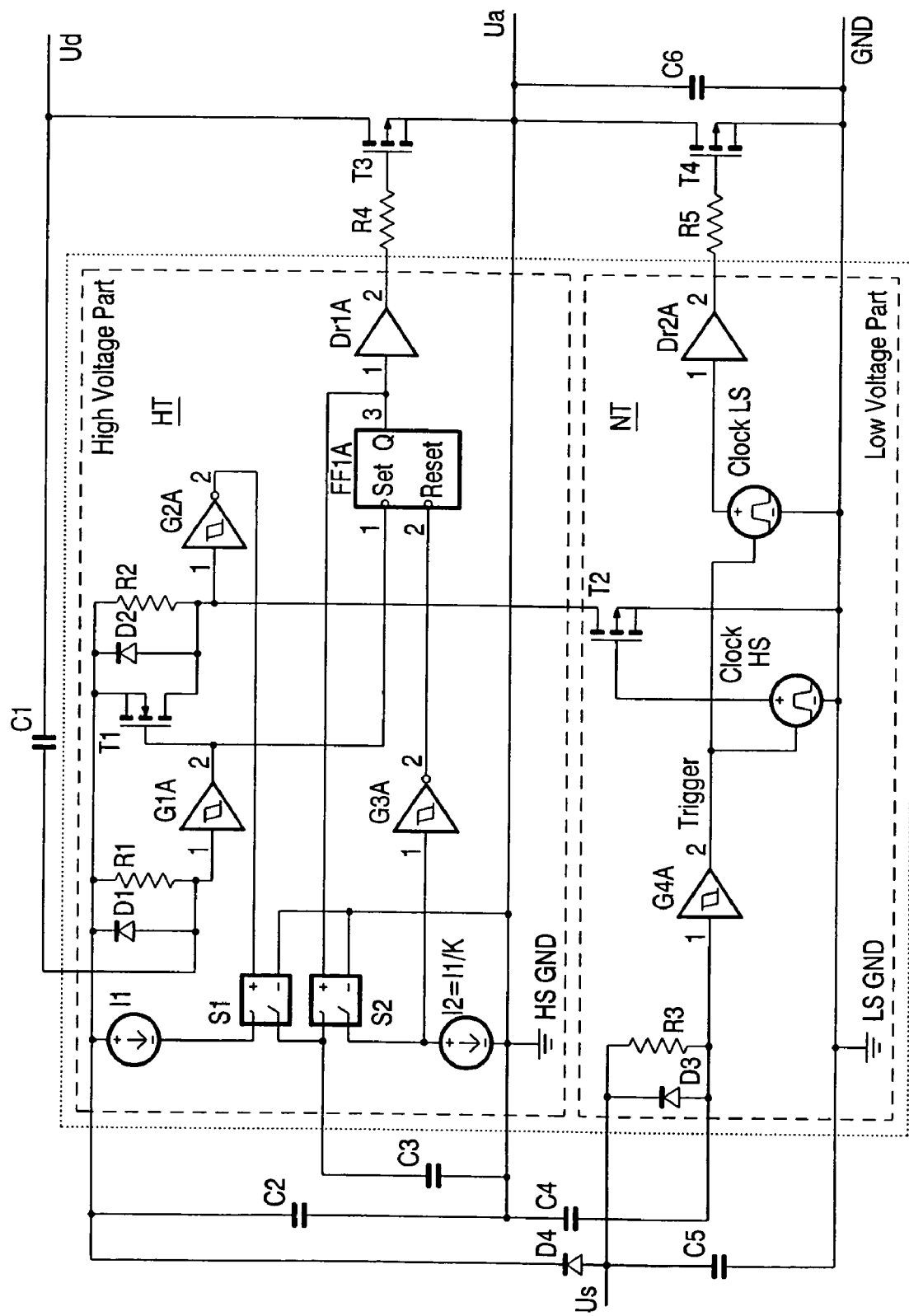
FIG. 4 shows a circuit diagram of a simplified complete circuit with switch-on condition by rise detection.

FIG. 4 shows a simplified complete circuit with switch-on condition by rise detection. In the low-voltage part NT, clock generators for the clock HS and the clock LS are provided, where the signal Clock LS is connected to the input 1 of a gate driver Dr2A. The output 2 of the latter supplies the output of the chip and is connected to the gate electrode of the lower MOSFET T4 via a resistor R5.

The drop detection consists of a capacitor C4 which on one side is at the output potential Ua and on the other side is connected to the input 1 of a Schmitt trigger G4A. At the same time, this side of the capacitor C4 is connected to the supply voltage input Us via a resistor R3 and a diode D3 connected in parallel with the latter, where voltages above the supply voltage are blocked by the diode D3.

The high-voltage part HT has a clock-flank-controlled flip-flop FF1A. At its input 1 there is connected the output of a voltage rise detection circuit, and at its reset input 2 there is connected the output of a comparator which detects the voltage at the integrated circuit arrangement of C3 and $I_1$ and, when a threshold is undershot, resets the flip-flop and thus ends the on-time of the MOSFET T3. Its output Q is connected to the output Out High Side of the chip via a gate driver Dr1A, where the output of the gate driver Dr1A is coupled to the gate electrode of the upper MOSFET T3 via a resistor R4. In the high-voltage part HT, the capacitor C3 is connected to a first constant current source I1 via a first switch S1 and to a second constant current source I2 via a second switch S2, where I2=I1/n. The first constant current source I1 is supplied by the input HSS of the chip and charges the capacitor C3 with a constant current when the first switch S1 is switched on. The second constant current source I2 is supplied by the capacitor C3 when the second switch S2 is switched on and charges the capacitor C3 with the above-defined constant current. The output of the second constant current source I2 is at the ground potential HSGND which slides with the output voltage Ua. The switch S1 is controlled by the signal at the output 2 of a Schmitt trigger G2A. The input 1 of the Schmitt trigger G2A is on the one hand coupled to the transistor T2 in the low-voltage part NT and on the other hand connected to the input HSS via a resistor R2, a diode D2 connected in parallel therewith, and a transistor T1 which is likewise connected in parallel therewith. The gate electrode of the transistor T1 is coupled to the output 2 of the Schmitt trigger G1A. The second switch S2 is controlled by the flip-flop FF1A via the output Q.

The voltage rise detection circuit has a Schmitt trigger G1A whose input 1 is on the one hand connected to the input HSS of the chip via a resistor R1 and a diode D1 connected in parallel therewith, where the diode D1 blocks voltages which are higher than the High Side Supply (HSS). The input 1 of the Schmitt trigger G1A is also connected to the capacitor C1, which is in turn connected to the supply voltage Ud.

The signals Clock HS and Clock LS in each case indicate the time for which the MOSFETs T3 and T4 are switched on. Here, Clock LS is at "1" for as long as the MOSFET T4 is to be switched on, the time of Clock LS is reduced by the factor "k", where "k" is the ratio between charge current and discharge current of the capacitor C3.

In the circuit diagram, I2=I1/k; likewise, I1=k*I2 could also have been selected.

The end of the voltage drop of Ua triggers both clock generators via the capacitor C4, the resistor R3 and the Schmitt trigger G4A.

Figure 5:
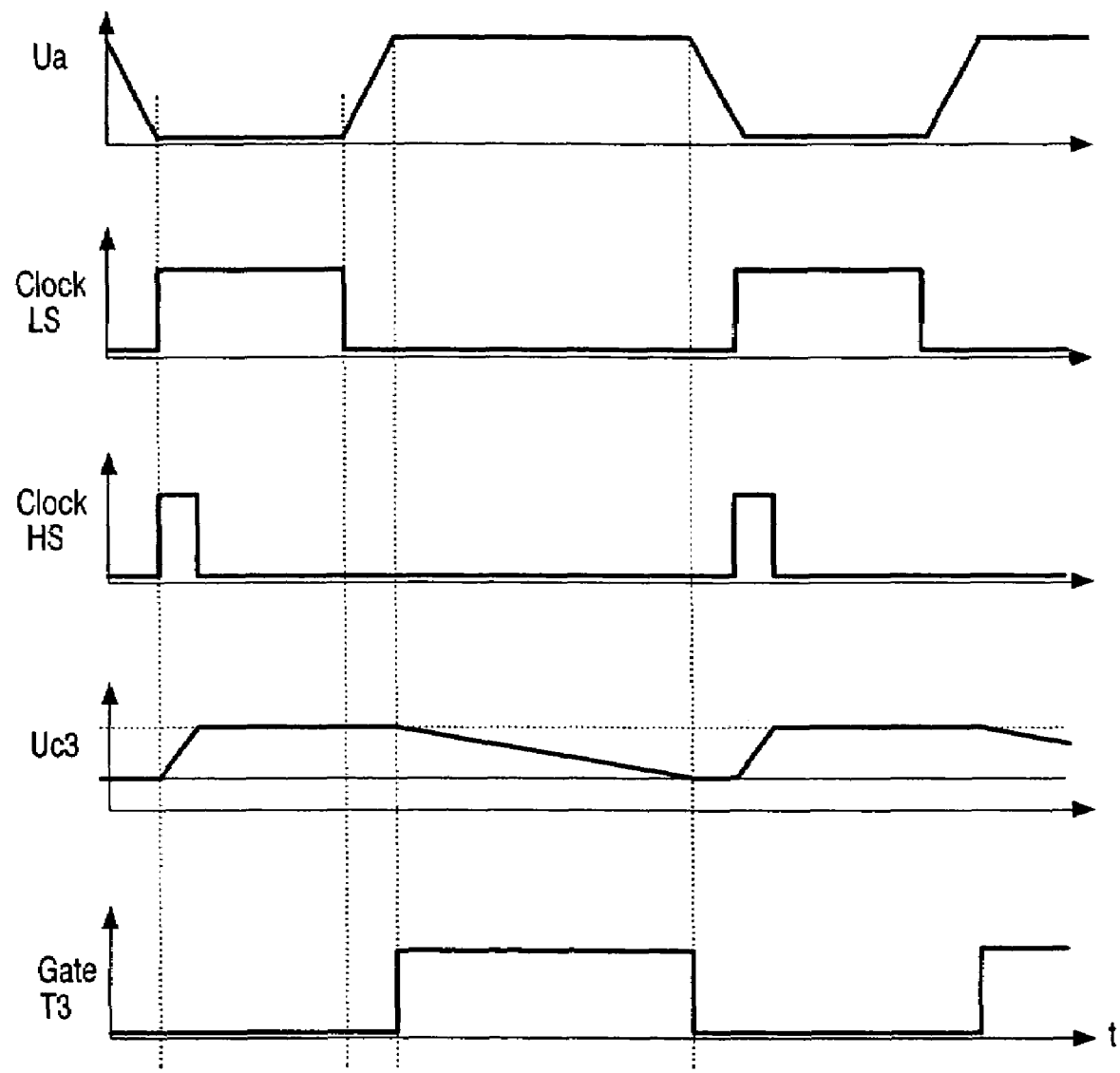
FIG. 5 shows signal profiles for the circuit as shown in FIG. 4.

FIG. 5 shows the signal profiles.

Figure 6:
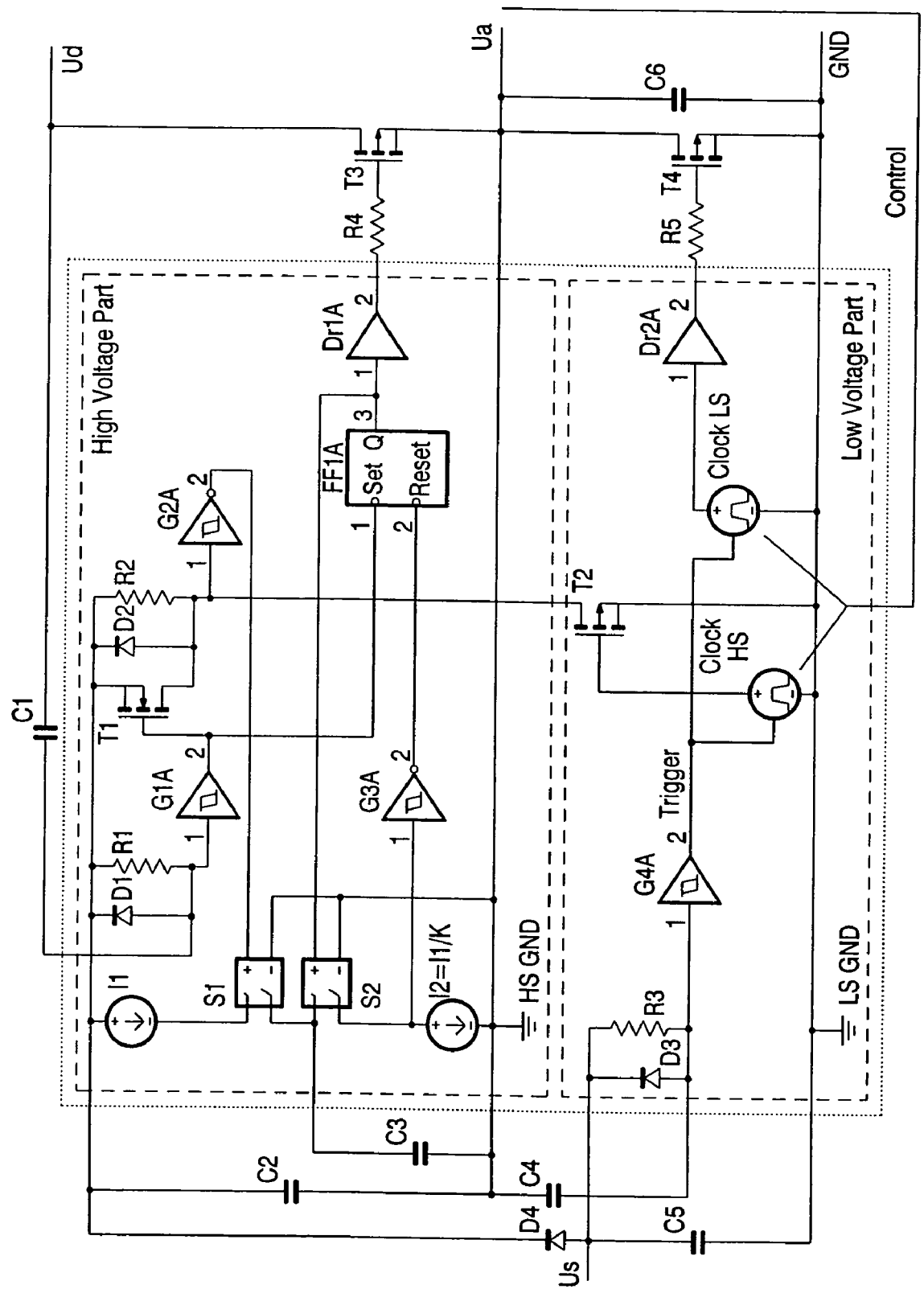
FIG. 6 shows an expansion of the circuit of FIG. 4 with control loop.

In practice, then, a control loop acts on the two clock generators and influences the times such that the desired output values are set. The circuit of FIG. 4 expanded by the control is shown in FIG. 6.

Figure 7:
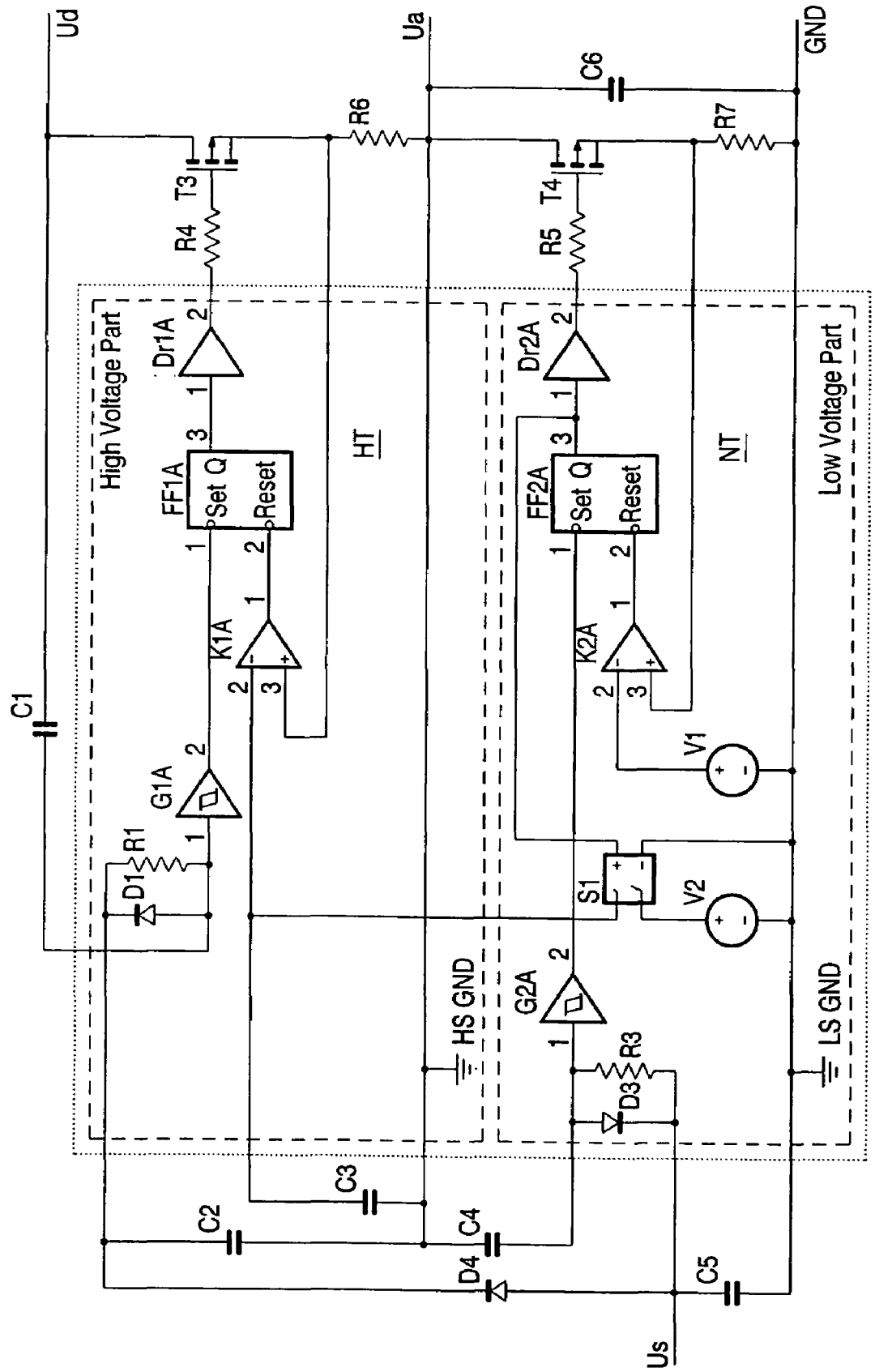
FIG. 7 shows a circuit diagram for implementing a further aspect of the method according to the invention.

FIG. 7 shows a circuit diagram of another aspect of the method according to the invention. The essential change with respect to the illustration of FIG. 4 is that the capacitor C3 in the high-voltage part HT is connected to the input 2 of a comparator K1A, the other input 3 of which is connected to HSGND via a resistor R6. The voltage sources V1 and V2 in the low-voltage part NT define the desired maximum current in the MOSFETs T4 and T3. The voltage sources V1 and V2 are in this case set by the control or regulation mechanism, and in symmetrical converters V1=V2. When the switch S1 is closed, the voltage source V2 charges the capacitor C3. The voltage source V1 is connected to the input 2 of a comparator K2A; the other input 3 is connected to GND via the resistor R7. The voltage across the resistor R6 or R7 is then measured via the terminals 10 and 11. This voltage is proportional to the current in the MOSFET T3 or T4. The transistors are switched on by the detection of the voltage transients. On account of the inductive response of the connected converter, the current rises continually after the respective MOSFET T3 or T4 has been switched on. If the voltage at the terminal 10 or 11 exceeds the maximum value defined by V1 or V2, then the respective MOSFET is switched off by means of the comparators K1A and K2A.

In order to make available the maximum value V2 on the high-voltage side, during the active time of the MOSFET T4 the switch S1 is closed and thus the capacitor C3 is charged to the value of V2.

Figure 8:
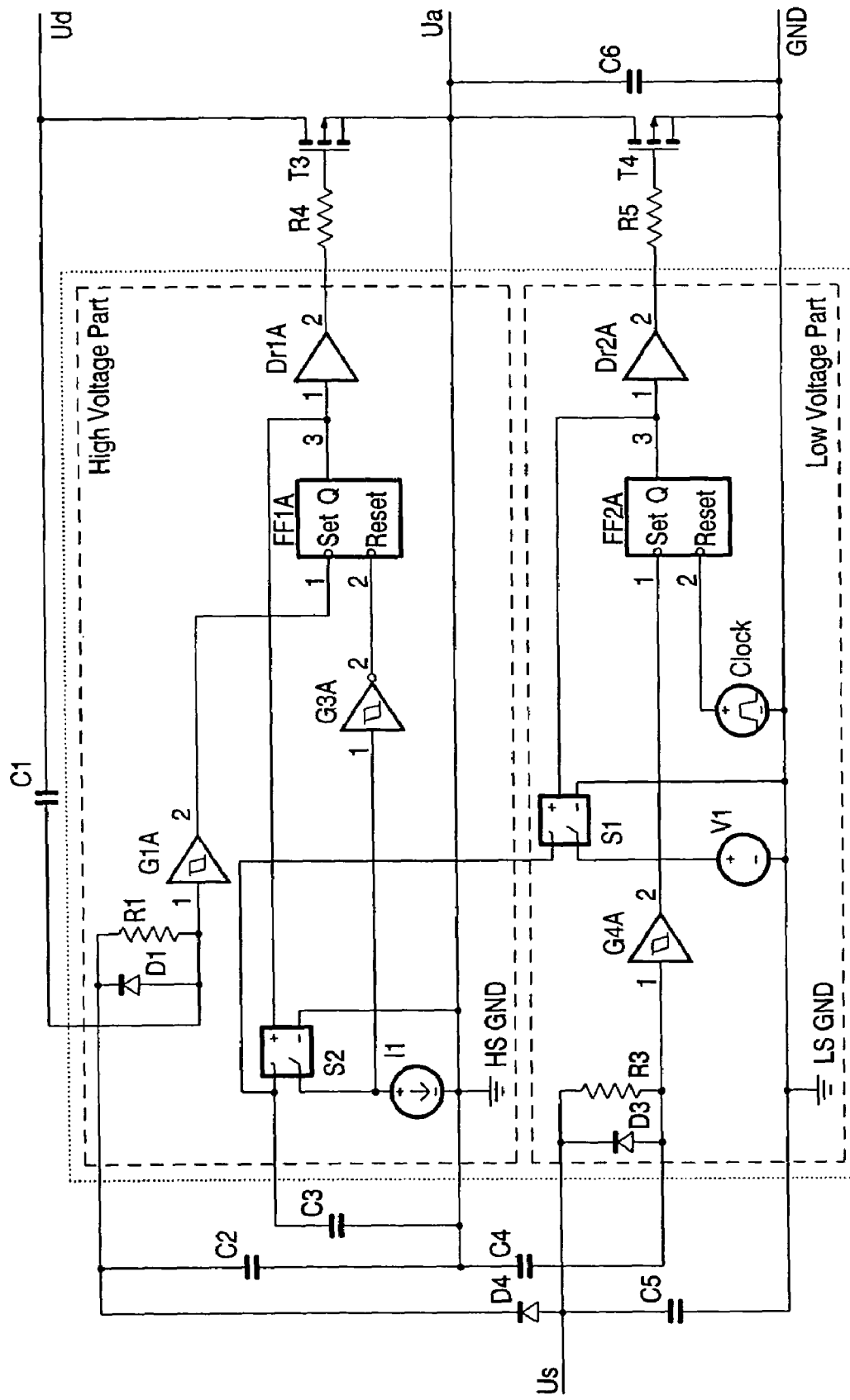
FIG. 8 shows a circuit diagram for implementing a third aspect of the method according to the invention.

FIG. 8 shows a third aspect of the method according to the invention. While the MOSFET T4 is switched on, the capacitor C2 is charged via the switch S1 to the voltage V1. The discharging via the switch S2 with the current I1 later determines the on-time of the MOSFET T3. In such a configuration, the "clock" assembly is realized in a similar manner, namely by charging a capacitor to a voltage value and determining the time by discharging. As already mentioned with reference to the other aspects of the present invention, the voltages V1 and the clock are then set, for example, via another voltage value by control or regulation.

In the embodiments, there are two essential sources of error against which suitable precautions must be taken.

1. Even during the on-time of the MOSFET T4 the potential of the High Side GND is not exactly equal to that of the Low Side GND, since the current flow through the MOSFET T4 and the resistor R7 generates a voltage difference. This must either be compensated or taken into account when designing a control loop.

2. The switch S1, usually designed with one or more transistors, in the opened state has a parasitic capacitance which leads to a change in the voltage across the capacitor C3.

The coupling of the capacitor C3 in practice requires additional measures in order to compensate for errors and component properties which are not ideal. Such measures are not carried out in the circuits described in the present text.

The direct incorporation into a back-coupling loop compensates for tolerances and errors which occur. The voltage to which the capacitor is charged can be taken directly from the output of an appropriate amplifier.

The advantages of the invention are in particular that the power consumption can be reduced by a factor of from 10 to 100. The degree of efficiency is thereby higher and the light load and standby modes are improved. The possibilities for integration are also improved on account of the lower power.

The invention claimed is:

1. A method of transmitting information between an information transmitter and an information receiver, the potential difference of which moves in cycles between a minimum value and a maximum value and is situated at the minimum value for regular time intervals; having the steps:

provision of information about the time interval or determination of the time interval in which the potential difference between information transmitter and information receiver reaches its minimum value;

closing of a switching means of the information transmitter to an information memory assigned to the information receiver, only within the time interval; and transmission and storage of the information in the information memory.

2. A method as claimed in claim 1, characterized in that the information is stored in the information memory as a set of charges.

3. A method as claimed in claim 1, characterized in that the information is a current value which is supplied over a predetermined on-time of the switching means.

4. A method as claimed in claim 1, characterized in that the information is a voltage value.

5. A method as claimed in claim 4, characterized in that the voltage value is used to set, synchronize or trace the frequency of a voltage-controlled oscillator, which then triggers events by way of counter registers.

6. A method as claimed in claim 1, characterized in that the information is a time value.

7. A method as claimed in claim 6, carried out in a driver circuit for controlling upper switching means as information receiver and lower switching means, where the control electronics, which are at the potential of the lower switching means, form the information transmitter, for converting a DC voltage into a clocked output voltage which has a high-voltage part for controlling the upper switching means and a low-voltage part for controlling the lower switching means, characterized in that the current value ($I_1$) for generating a set of charges is made to be proportional to the discharge current ($I_2$), so that $$I_1 = k * I_2 \text{ with } k > r_{max} > 1,$$

where $r_{max}$ is the maximum occurring duty cycle, defined as the maximum on-time of the upper switching means divided by the minimum on-time of the lower switching means.

8. A method as claimed in claim 1, carried out in a driver circuit for controlling upper switching means as the information receiver and lower switching means, where control electronics, which are at a potential of the lower switching means, form the information transmitter, for converting a DC voltage into a clocked output voltage which has a high-voltage part for controlling the upper switching means and a low-voltage part for controlling the lower switching means, characterized in that a current value is determined which corresponds to a switch-off condition of the upper switching means, and the information memory is charged to a voltage that is proportional to the current value of the switch-off condition.

9. A method as claimed in claim 1, carried out in a driver circuit for controlling upper switching means as information receiver and lower switching means, where the control electronics, which are at the potential of the lower switching means, form the information transmitter, for converting a DC voltage into a clocked output voltage which has a high-voltage part for controlling the upper switching means and a low-voltage part for controlling the lower switching means, characterized in that a current value is determined which corresponds to a switch-off condition of a load controlled by the driver circuit, and the information memory is charged to a voltage that is proportional to the current value of the switch-off condition, where the switch-off condition is a previously determined excess current across the upper switching means.

10. A method as claimed in claim 1, carried out in a driver circuit for controlling upper switching means as information receiver and lower switching means, where control electronics, which are at the potential of the lower switching means, form the information transmitter, for converting a DC voltage into a clocked output voltage which has a high-voltage part for controlling the upper switching means and a low-voltage part for controlling the lower switching means, characterized in that during the time at the minimum value of the potential difference, the information memory is charged to a voltage that is proportional to the on-time of the upper switching means, and after the upper switching means have reached the maximum value of the potential, the voltage is converted back into a time.

11. A driver circuit for controlling upper switching means as an information receiver and lower switching means as an information transmitter for converting a DC voltage into a clocked output voltage which has a high-voltage part for controlling the upper switching means and a low-voltage part for controlling the lower switching means, characterized in that there is provided a device for providing information about a time interval or for determining a time interval in which a potential difference between the information transmitter and the information receiver reaches its minimum value;

a switching means which closes a connection from the information transmitter to an information memory for the information which is assigned to the information receiver, only within the time interval.

12. A driver circuit as claimed in claim 11, characterized in that the information memory is an analog memory or a digital memory.

13. A driver circuit as claimed in claim 12, characterized in that the information memory is a capacitor.

14. A driver circuit as claimed in claim 13, characterized in that a current value ($I_1$) for generating a set of charges in the capacitor is made to be proportional to the discharge current ($I_2$) of the capacitor, so that $$I_1 = k * I_2 \text{ with } k > r_{max} > 1,$$

where $r_{max}$ is a maximum occurring duty cycle, defined as a maximum on-time of the upper switching means divided by a minimum on-time of the lower switching means.

15. A driver circuit as claimed in claim 12, characterized in that the information memory is a counter or a register.

16. A driver circuit as claimed in claim 15, characterized in that the counter counts a first number ($N_1$) of steps for the upper switching means and a second number ($N_2$) of steps for the lower switching means, where $$N_1 = k * N_2 \text{ with } k > r_{max} > 1,$$

where $r_{max}$ is a maximum occurring duty cycle, defined as a maximum on-time of the upper switching means divided by a minimum on-time of the lower switching means.

17. A driver circuit as claimed in claim 11, characterized in that it has a device for determining a current value which corresponds to a switch-off condition of the upper switching means, and in that the information memory is charged to a voltage that is proportional to the current value of the switch-off condition.

18. A driver circuit as claimed in claim 11, characterized in that it has a device for determining a current value which corresponds to a switch-off condition of a load controlled by the driver circuit, and in that the information memory is charged to a voltage that is proportional to the current value of the switch-off condition, where the switch-off condition is a previously determined excess current across the upper switching means.

* * * * *